United States Patent
Sato et al.

(10) Patent No.: US 6,263,270 B1
(45) Date of Patent: *Jul. 17, 2001

(54) VEHICLE STEERING CONTROL APPARATUS

(75) Inventors: Kunihito Sato, Mishima; Takeshi Goto, Toyota; Yuichi Kubota, Susono, all of (JP)

(73) Assignee: Toyota Jidosha Kabushiki Kaisha, Aichi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/970,421

(22) Filed: Nov. 14, 1997

(30) Foreign Application Priority Data

Nov. 26, 1996 (JP) ........................................ 8-314978

(51) Int. Cl.7 .............................. G06F 7/00; B62D 6/00
(52) U.S. Cl. ................... 701/41; 701/23; 701/28; 180/167; 180/168; 180/169; 340/901; 340/937
(58) Field of Search ........................ 701/41, 42, 43, 701/36, 23, 45, 28, 24; 180/412, 416, 443, 446, 415, 167, 168, 169; 340/438, 441, 901, 903, 904, 937

(56) References Cited

U.S. PATENT DOCUMENTS

| 4,361,202 | * | 11/1982 | Minovich | 180/168 |
| 4,970,653 | * | 11/1990 | Kenue | 701/301 |
| 5,014,204 | * | 5/1991 | Mamimura et al. | 701/23 |
| 5,081,585 | * | 1/1992 | Kurami et al. | 701/23 |

(List continued on next page.)

FOREIGN PATENT DOCUMENTS

| 64-32970 | 2/1989 | (JP). |
| 3-164374 | 7/1991 | (JP). |
| 5-85383 | 4/1993 | (JP). |
| 5-294250 | 11/1993 | (JP). |
| 5-297939 | * 11/1993 | (JP). |
| 7-105498 | * 4/1995 | (JP). |
| 8-26129 | 1/1996 | (JP). |

Primary Examiner—Jacques H. Louis-Jacques
(74) Attorney, Agent, or Firm—Finnegan, Henderson, Farabow, Garrett & Dunner, L.L.P.

(57) ABSTRACT

A steering control apparatus prevents interference between a steering operation of a driver and a steering control operation of the steering control apparatus by detecting a steering operation so as to decrease an amount of the steering control operation when the steering operation is performed by the driver. A guide line provided on a vehicle moving lane on which the vehicle is moving is recognized so as to set a target position on the vehicle moving lane based on a result of recognition of the guide line. A steering control operation is performed so that the vehicle moves to trace the target position. An amount of each component of a steering operation applied to a steering wheel is detected by a steering angle sensor and a steering torque sensor. An amount of the steering control operation is corrected so that the amount of the steering control operation is decreased in accordance with the amount of each component of the steering operation.

9 Claims, 7 Drawing Sheets

U.S. PATENT DOCUMENTS

| | | | | |
|---|---|---|---|---|
| 5,245,422 | * | 9/1993 | Borcherts et al. | 348/119 |
| 5,410,480 | * | 4/1995 | Koseki et al. | 701/23 |
| 5,483,453 | * | 1/1996 | Uemura et al. | 701/23 |
| 5,485,378 | * | 1/1996 | Franke et al. | 701/23 |
| 5,517,412 | * | 5/1996 | Unoura | 701/23 |
| 5,541,841 | * | 7/1996 | Tanaka | 701/41 |
| 5,610,816 | * | 3/1997 | Kim | 701/24 |
| 5,661,472 | * | 8/1997 | Koshizawa | 340/901 |
| 5,699,057 | * | 12/1997 | Ikeda et al. | 340/937 |
| 5,765,116 | * | 6/1998 | Wilson-Jones et al. | 701/41 |
| 5,781,119 | * | 7/1998 | Yamashita et al. | 340/903 |
| 5,875,408 | * | 2/1999 | Bendett et al. | 701/23 |
| 5,904,223 | * | 5/1999 | Shimizu et al. | 701/41 |
| 5,907,277 | * | 5/1999 | Tokunaga | 340/441 |
| 5,913,375 | * | 6/1999 | Nishikawa | 180/168 |
| 5,938,707 | * | 8/1999 | Uehara | 701/41 |
| 5,957,983 | * | 9/1999 | Tominaga | 701/23 |
| 6,053,270 | * | 4/2000 | Nishikawa et al. | 180/168 |
| 6,070,112 | * | 5/2000 | Sato et al. | 701/41 |

* cited by examiner

VEHICLE STEERING CONTROL APPARATUS

BACKGROUND OF THE INVENTION

1. Field of the Invention

The present invention relates to a steering control apparatus for a vehicle and, more particularly, to a steering control apparatus for a vehicle which controls a steering operation so that the vehicle moves within a lane by recognizing the lane by a forward image of the vehicle.

2. Description of the Related Art

Conventionally, in order to safely move a vehicle, a vehicle steering control apparatus has been suggested which controls a steering operation by recognizing a guide line such as a white line provided on a road surface so that the vehicle moves along the guide line without turning aside from the guide line.

For example, Japanese Laid-Open Patent Application No.5-294250 discloses a safety device provided on a vehicle. The safety device detects a following vehicle which is moving behind the safety device equipped vehicle when the safety device equipped vehicle is moving to the lane on which the following vehicle is moving while a direction indicating operation is performed. The safety device performs an alarm operation when the following vehicle is detected. Additionally, the safety device performs a steering control operation to maintain the safety device equipped vehicle to move along the current moving lane when a direction indicating operation is not performed.

In the above-mentioned conventional safety device, unless a direction indicating operation is performed, the safety device equipped vehicle is maintained to move along the vehicle moving lane so that the safety device equipped vehicle does not move out of the vehicle moving lane. Thus, there may be a case in which a steering operation of a driver interferes with a steering control operation of the safety device. For example, if there is an object on a road, and a driver performs a steering operation so as to avoid the object by moving out of the vehicle moving lane, the safety device performs a steering control operation so as to maintain the vehicle within the vehicle moving lane. Accordingly, in such a case, there is a problem in that the steering operation of the driver interferes with the steering control operation of the safety device.

SUMMARY OF THE INVENTION

It is a general object of the present invention to provide an improved and useful steering control apparatus for a vehicle in which the above-mentioned problem is eliminated.

A more specific object of the present invention is to provide a steering control apparatus which prevents interference between a steering operation of a driver and a steering control operation of the steering control apparatus by detecting a steering operation so as to decrease an amount of steering control operation when the steering operation is performed by the driver's will.

In order to achieve the above-mentioned objects, there is provided according to the present invention a steering control apparatus for a vehicle which performs a steering control operation, comprising:

guide line recognizing means for recognizing a guide line provided on a vehicle moving lane on which the vehicle is moving so as to set a target position on the vehicle moving lane based on a result of recognition of the guide line;

steering control means for performing a steering control operation so that the vehicle moves to trace the target position;

steering operation detecting means for detecting an amount of at least one component of a steering operation applied to a steering wheel; and correcting means for correcting an amount of the steering control operation so that the amount of the steering control operation is decreased in accordance with an amount of the steering operation detected by the steering operation detecting means.

In the above-mentioned invention, referring to FIG.1 which shows a principle of the present invention, the guide line recognizing means M1 is provided for recognizing a guide line on the road surface. A target position on the vehicle moving lane is set based on a result of recognition of the guide line. The steering control means M2 controls a steering operation so that the vehicle moves to trace the target position. The steering operation detecting means M3 detects an amount of at least one component of the steering operation applied to the steering wheel so that an amount of the steering control operation is corrected by the correcting means M4. That is, the amount of the steering control operation is decreased in accordance with the amount of a component of the steering operation detected by the steering operation detecting means M3.

Thus, according to the present invention, when the driver performs a steering operation, a steering operation being performed by the driver can be known from a component of the steering operation such as a front wheel steering angle, an angular velocity of a steering operation or a steering torque. Since the amount of the steering control operation is decreased when the driver is performing the steering operation, interference between the steering operation of the driver and the steering control operation of the steering control apparatus can be prevented. Thus, if the driver attempts to move the vehicle to other lanes, the amount of control of the steering control apparatus is decreased and, thereby, the drivability is improved.

In one embodiment of the present invention, the guide line recognizing means may comprises:

a camera which takes an image of a forward view of the vehicle; and a guide line recognizing unit which processes the image taken by the camera so as to recognize the guide line and set the target position, the guide line recognizing unit calculating a distance between the vehicle and the guide line and an amount of offset of a present position of the vehicle from the target position.

Additionally, the steering control means may include:

a steering mechanism operated by an electric motor;

steering calculating means for calculating an amount of steering to be achieved by the steering mechanism in accordance with the offset amount of the vehicle; and a drive circuit which controls the electric motor so that the amount of steering calculated by the steering calculating means is achieved.

Additionally, in the steering control apparatus according to the present invention, the steering operation detecting means may include:

a steering angle sensor which detects a steering angle and an angular velocity generated by the steering operation applied to the steering wheel; and a steering torque sensor which detects a steering torque generated by the steering operation applied to the steering wheel.

The correcting means may determine a factor for each of the steering angle, the angular velocity and the steering torque so as to correct the amount of the steering control operation in accordance with a value obtained from the factors.

In one embodiment of the present invention, the factor obtained from the steering angle is set to one when the steering angle is zero and is decreased to zero as the steering angle is increased; the factor obtained from the angular velocity is set to one when the angular velocity is zero and decreased to zero when the angular velocity is increased to a predetermined value; the factor obtained from the steering torque is set to one when the steering torque is zero and starts to decrease to zero when the steering torque exceeds a predetermined value.

Other objects, features and advantages of the present invention will become more apparent from the following detailed description when read in conjunction with the accompanying drawings.

DETAILED DESCRIPTION OF THE PREFERRED EMBODIMENT

Figure 2:
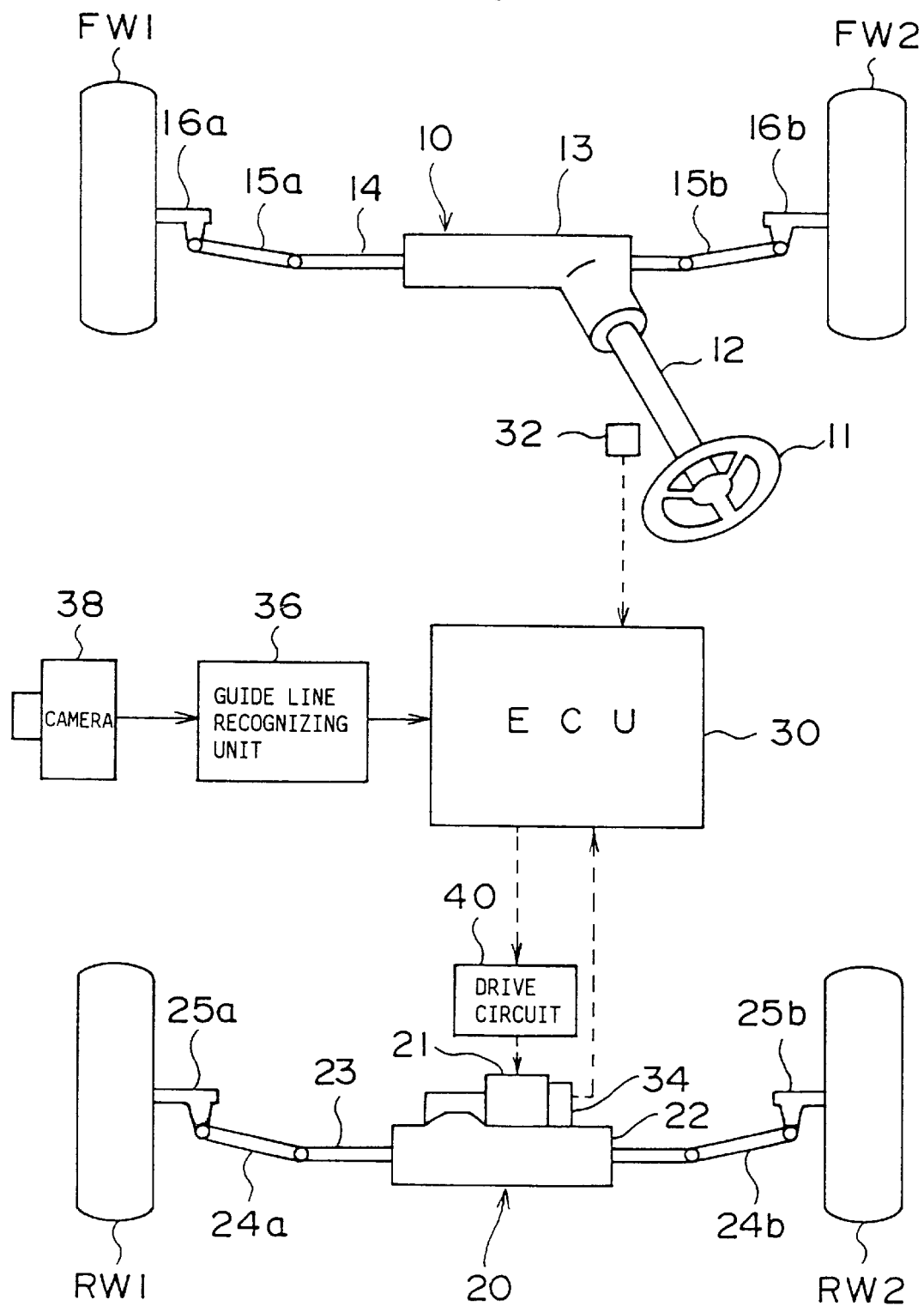
FIG. 2 is an illustration of a structure of a steering control apparatus according to an embodiment of the present invention.

A description will now be given, with reference to FIG. 2, of an embodiment of the present invention. FIG. 2 is an illustration of a structure of a steering control apparatus according to the embodiment of the present invention.

In FIG. 2, a front wheel steering mechanism 10 includes a steering wheel 11 which is connected to a pinion gear (not shown in the figure) provided in a steering gear box 13 via a steering shaft 12. The pinion gear is engaged with a rack bar 14 so as to convert a rotational motion of the steering wheel into a reciprocal motion of the rack bar 14. Opposite ends of the rack bar 14 are connected to left and right front wheels FW1 and FW2 via left and right tie rods 15a and 15b and left and right knuckle arms 16a and 16b, respectively, so that the left and right front wheels FW1 and FW2 are operated by a steering operation of the steering wheel 11.

A rear wheel steering mechanism 20 includes an electric motor 21 such as a brushless motor which serves as an actuator for steering left and right rear wheels RW1 and RW2. A rotational shaft (not shown in the figure) of the electric motor 21 is connected to a relay rod 23 via a reduction mechanism (not shown in the figure) provided in a steering gear box 22. The relay rod 23 is movable in a longitudinal direction thereof. The reduction mechanism is constructed so that the electric motor 21 cannot be operated by a force exerted on the relay rod 23. Opposite ends of the relay rod 23 are connected to the left and right rear wheels RW1 and RW2 via left and right tie rods 24a and 24b and left and right knuckle arms 25a and 25b, respectively, so that the left and right rear wheels RW1 and RW2 are operated by axial movement of the relay rod 23.

A front wheel steering angle sensor 32, a steering torque sensor 33, a rear wheel steering angle sensor 34 and a guide line recognizing unit 36 are connected to an electronic control unit (ECU) 30. The front wheel steering angle sensor 32 detects a steering angle of the left and right front wheels FW1 and FW2 as one of the components of the steering operation. The steering torque sensor 33 detects a steering torque applied to the front wheels as one of the components of the steering operation. The rear wheel steering angle sensor 34 detects a steering angle of the left and right rear wheels RW1 and RW2. The front wheel steering angle sensor 32 and the steering torque sensor 33 serve as the steering operation detecting means M3.

The guide line recognizing unit 36, which serves as the guide line recognizing means M1, processes an image of the road in front of the vehicle. The image of the road is taken by a camera 38 and supplied to the guide line recognizing unit 36. The guide line recognizing unit 36 detects guide lines provided on the road surface such as a center line, a lane separation line and passing prohibition line by processing the image of the road so as to recognize the lane on which the vehicle is moving based on the detected guide lines.

Figure 3:
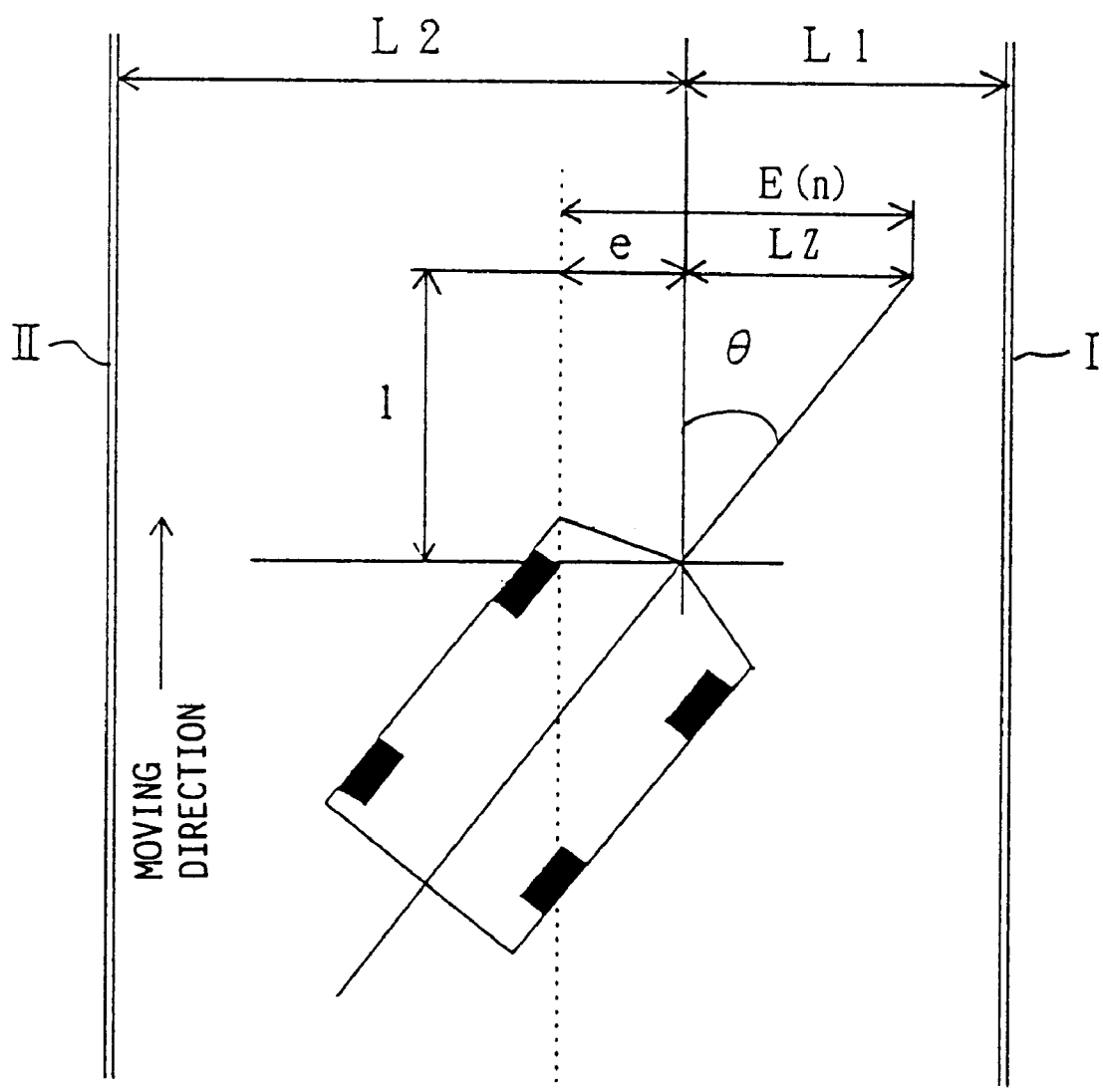
FIG. 3 is an illustration for explaining a relationship between guide lines and a vehicle moving between the guide lines.

FIG. 3 is an illustration for explaining a relationship between guide lines I and II and the vehicle moving between the guide lines. The guide line recognizing unit 36 detects a present offset amount e of the vehicle from the center line (indicated by a dotted line) between the guide lines I and II. The guide line recognizing unit 36 also detects distances from each of the guide lines I and II. In FIG. 3, an angle θ is an inclination angle of the vehicle with respect to the lane which is obtained from the image of the road. In FIG. 3, E(n) represents an offset amount of a front viewing point from the center of the lane, and LZ represents an offset amount of the front viewing point from the current position of the vehicle. The offset amount E(n) and the offset amount LZ are represented as follows, where 1 (constant value) is a front viewing point distance and e is the offset amount of the vehicle in a transverse direction of the lane.

$$E(n)=e+LZ$$

$$LZ=1\times\theta$$

The offset amount E(n) is supplied to the ECU 30.

Figure 4:
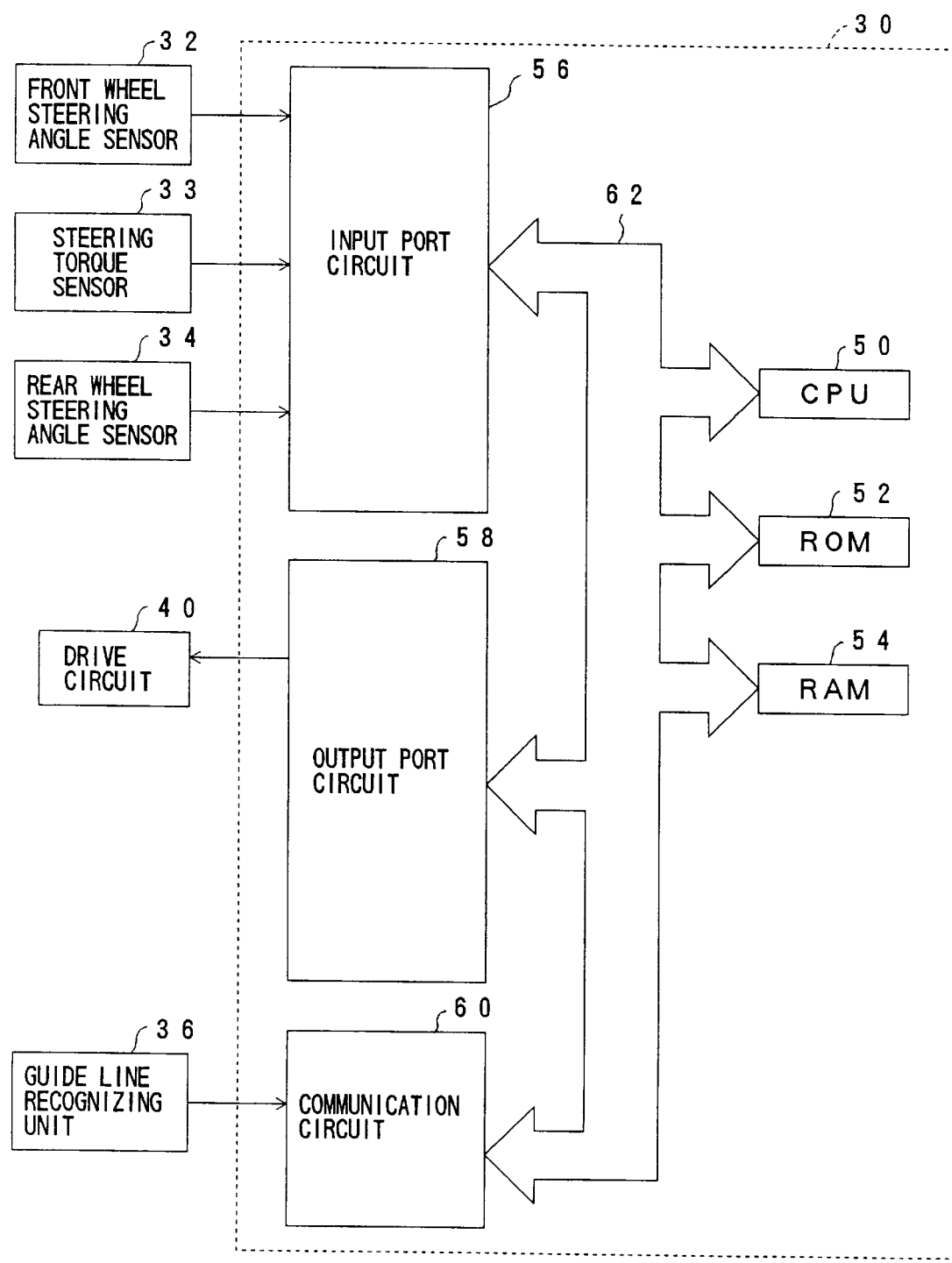
FIG. 4 is a block diagram of an ECU shown in FIG. 2.

FIG. 4 is a block diagram of the ECU 30. As shown in FIG. 4, the ECU 30 has a a microcomputer structure, and comprises a central processing unit (CPU) 50, a read only memory (ROM) 52, a random access memory (RAM) 54, an input port circuit 56, an output port circuit 58 and a communication circuit 60, all of which are interconnected by a bidirectional common bus 62.

The input port circuit 56 is provided with detection signals output from the front steering angle sensor 32, the steering torque sensor 33 and the rear steering angle sensor 34. Additionally, the offset amount E(n) output from the guide line recognizing unit 36 is supplied to the communication circuit 60.

The ROM 52 stores control programs. The CPU 50 performs various calculations in accordance with the control programs by using the RAM 54 which serves as a working area. Control signals are produced by calculations performed by the CPU 50, and the control signals are supplied to a drive circuit 40 via the output port circuit 58. The drive circuit 40 drives the electric motor 21 so as to steer the rear wheels RW1 and RW2.

Figure 1:
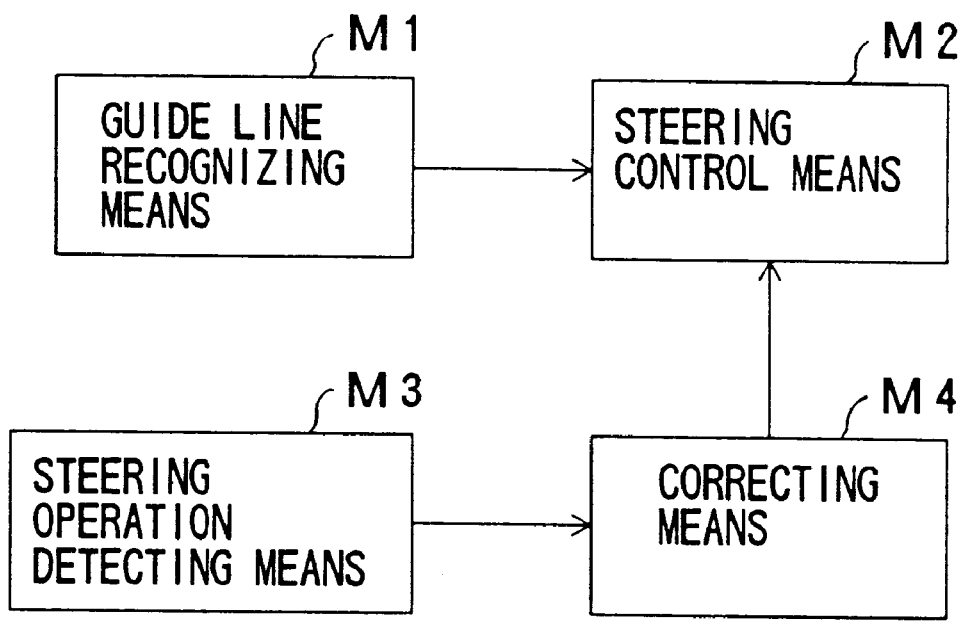
FIG. 1 is an illustration for explaining a principle of the present invention.
Figure 5:
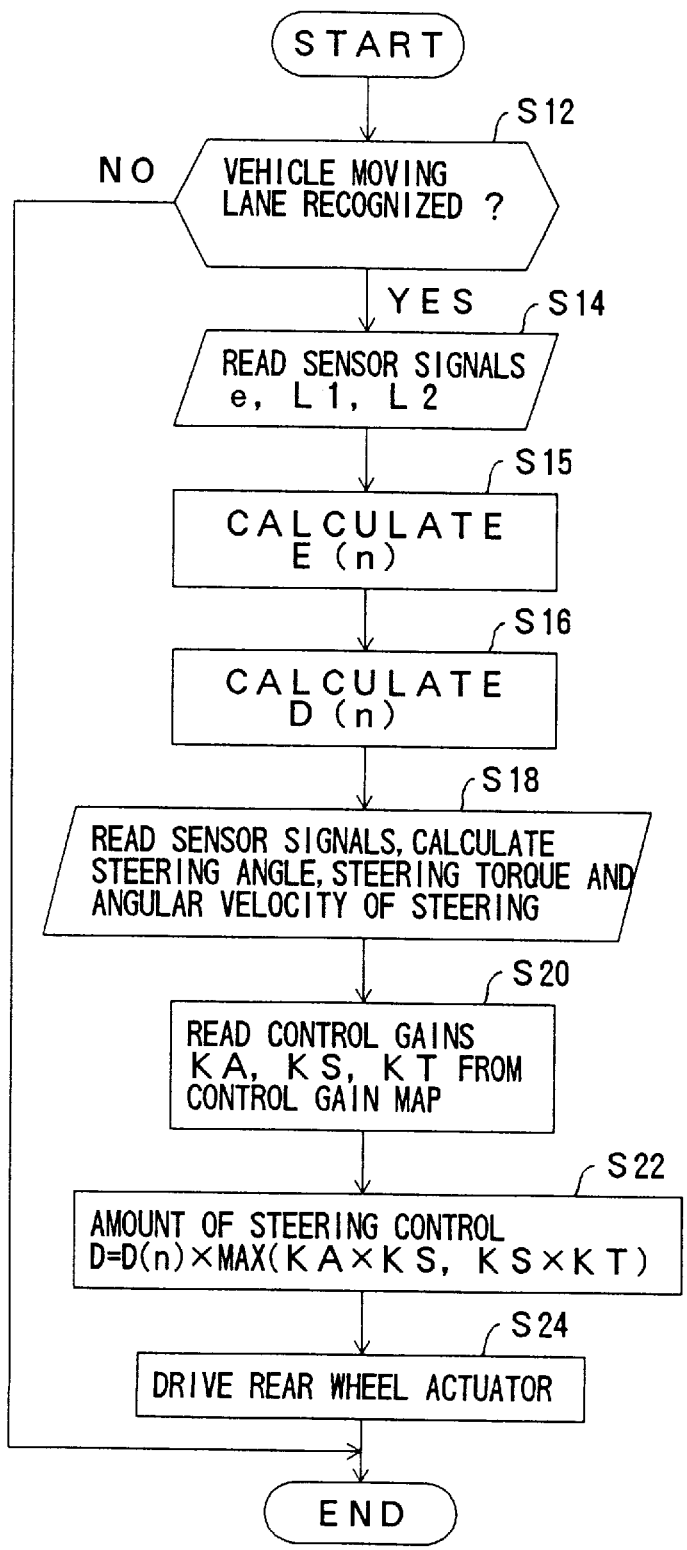
FIG. 5 is a flowchart of a steering control operation performed by a CPU shown in FIG. 4.

FIG. 5 is a flowchart of a steering control operation performed by the CPU 30. This steering control operation corresponds to the steering control means M2 shown in FIG. 1. In FIG. 5, it is determined, in step S12, whether or not the vehicle moving lane is recognized by the guide line recognizing unit 36. When the vehicle moving lane is recognized, the routine proceeds to step S14. If the vehicle moving lane is not recognized, the routine is ended.

In step S14, the offset amount e and the distances L1 and L2 which are output from the guide line recognizing unit 36 are read. In step S15, the offset amount E(n) is calculated. Then, in step S16, a rear wheel steering control amount D(n) is calculated by the following relationship, where D(n−1) is a rear wheel steering control amount from the previous time, E(n−1) is an offset amount of the vehicle from the previous time and K1 is a rear wheel control gain (constant value).

$$D(n)=D(n-1)+K1\times\{E(n)-E(n-1)\} \qquad (1)$$

Thereafter in step S18, a steering angle $\theta F$ detected by the front wheel steering angle sensor 32 and a steering torque TS detected by the steering torque sensor 33 are read. Then, a difference between the steering angle $\theta F$ from the present time and the steering angle $\theta F0$ from the previous time is obtained. An angular velocity $S\theta F$ of steering is calculated by dividing the difference by a time interval of the processes.

Figure 6:
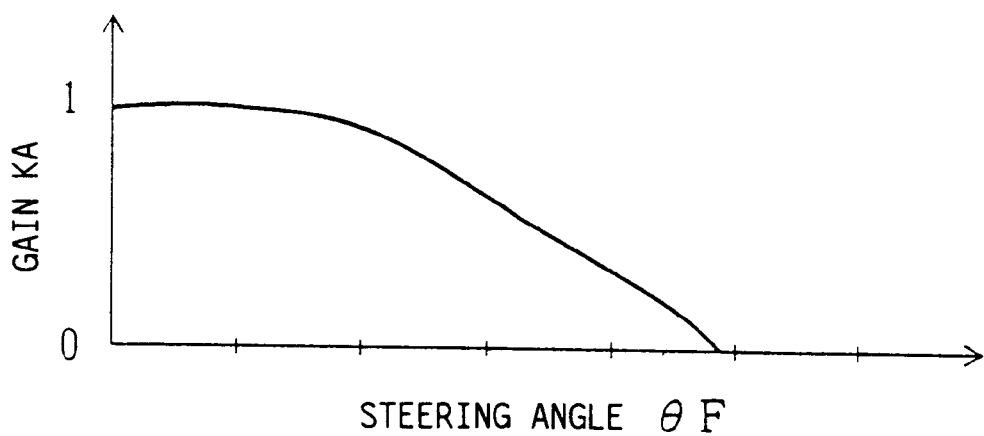
FIG. 6 is a graph showing a relationship between a steering angle and a gain.
Figure 7:
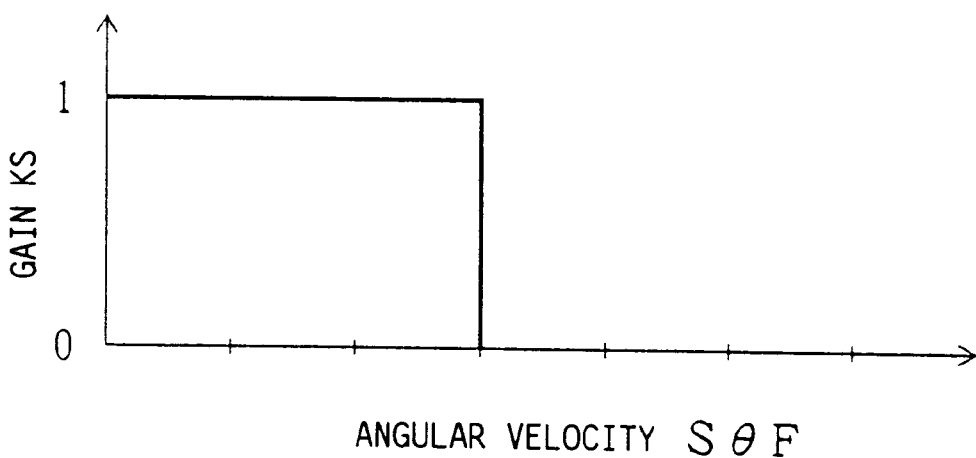
FIG. 7 is a graph showing a relationship between an angular velocity for steering and a gain.
Figure 8:
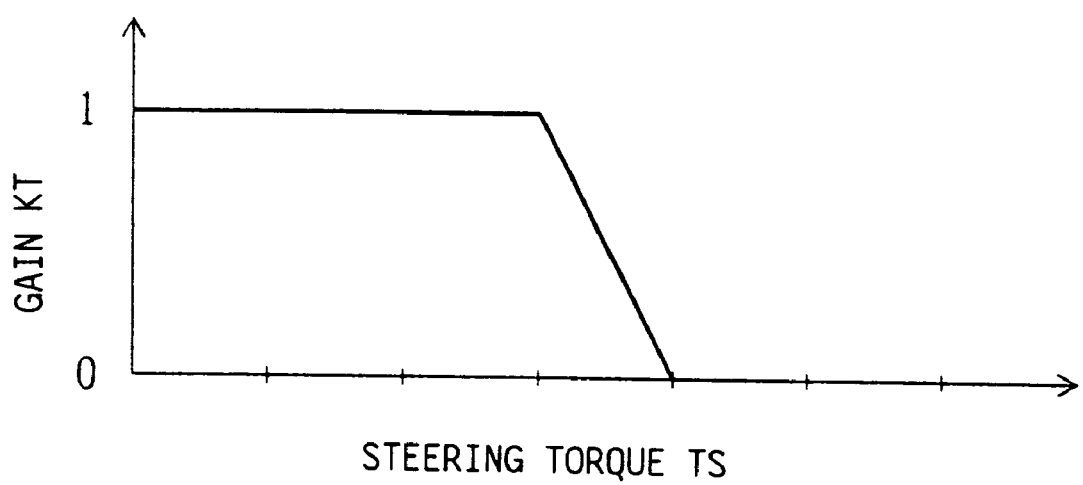
FIG. 8 is a graph showing a relationship between a steering torque and a gain.

In step S20, a correction gain or factor KA is calculated based on the steering angle $\theta F$ with reference to a map representing a graph shown in FIG. 6. Additionally, a correction gain or factor KS is calculated based on the angular velocity $S\theta F$ with reference to a map representing a graph shown in FIG. 7. Further, a correction gain or factor KT is calculated based on the steering torque TS with reference to a map representing a graph shown in FIG. 8.

The correction gain KS is set to 1 when the steering angle $\theta F$ is small. The correction gain KS gradually decreases as the steering angle $\theta F$ is increased, and finally becomes zero. The correction gain KS is set to 1 when the angular velocity $S\theta F$ is small. The correction value KS becomes zero when the angular velocity $S\theta F$ exceeds a predetermined value. The correction gain KT is set to 1 when the steering torque is small. The correction gain KT starts to gradually decrease when the steering torque exceeds a predetermined value, and finally becomes zero. In this embodiment, it is regarded that a steering operation is being performed when the steering angle $\theta F$ is large or the angular velocity of steering is large or the steering torque is large, and, thus, each of the correction gains KA, KS and KT is set to zero.

In step S22, an actual rear wheel steering control amount D is calculated based on the following relationship by using a rear steering control amount D(n) and the correction gains KA, KS and KT.

$$D=D(n)\times \mathrm{MAX}(KA\times KS, KS\times KT) \qquad (2)$$

Where MAX(A, B) represents selection of one of A and B which is greater than the other.

According to the relationship (2), the correction of the rear steering control amount D(n) mainly depends on the correction gain KS which is determined by the angular velocity $S\theta F$. That is, when the angular velocity $S\theta F$ of steering is large, the correction gain KS becomes equal to zero and, thereby, the control amount D also becomes equal to zero. On the other hand, when the angular velocity $S\theta F$ is small, the control gain KS is increased. In this condition, the control amount is corrected so that the driver's will is reflected by the correction gain KA which is determined by the steering angle $\theta F$ or the correction gain KT which is determined by the steering torque TS.

In step 24, the drive circuit 40 is operated based on the actual rear wheel steering control amount D. Thereby, the electric motor 21 is driven which steers the rear wheels RW1 and RW2, and then the routine is ended. The process of steps S20 and S22 correspond to the correcting means M4.

Thus, when the driver performs a steering operation, the fact that the driver performs a steering operation can be known from a state of the steering operation such as the front wheel steering angle $\theta F$, the angular velocity $S\theta F$ of a steering operation or the steering torque TS. Since the amount of steering control is decreased when the driver is performing the steering operation, interference between the steering operation of the driver and the steering control operation of the steering control apparatus can be prevented. Thus, for example, if the driver attempts to move the vehicle to the lane on the right side and rotates the steering wheel to the right when there is no vehicle behind the vehicle on the right side lane, the control amount of the steering control apparatus is decreased and thereby the drivability is improved.

It should be noted that in the above-mentioned embodiment, although the steering control is applied to the rear wheels, the steering control may be applied to the front wheels.

The present invention is not limited to the specifically disclosed embodiments, and variations and modifications may be made without departing from the scope of the present invention.

What is claimed is:

1. A steering control apparatus for a driver-operable vehicle which performs a steering control operation comprising:

guide-line recognizing means for recognizing a guide line provided on a vehicle moving lane on which said vehicle is moving so as to set a target position on the vehicle moving lane based on a result of recognition of said guide line, said guide line recognizing means including:

a camera which takes an image of a forward view of said vehicle; and a guide line recognizing unit which processes an image taken by said camera so as to recognize the guide line and set the target position, said guide line recognizing unit calculating a distance between said vehicle and the guide line and an amount of offset of a present position of said vehicle from the target position;

steering control means for performing a steering control operation so that said vehicle moves to trace said target position;

steering operation detecting means for detecting an amount of a component of a steering operation applied to a steering wheel by the driver; and correcting means for calculating an amount of the steering control operation to be achieved by said steering control means based on the distance between said vehicle and the guideline and the amount of offset of the present position of said vehicle from the target position, and for decreasing the calculated amount of the steering control operation in accordance with the amount of the component of the steering operation detected by said steering operation detecting means.

2. The steering control apparatus as claimed in claim 1, wherein said steering control means includes:

a steering mechanism operated by an electric motor;

steering calculating means for calculating an amount of steering to be achieved by said steering mechanism in accordance with the offset amount of said vehicle; and a drive circuit which controls said electric motor so that the amount of steering calculated by said steering calculating means is achieved.

3. The steering control apparatus as claimed in claim 1, wherein said steering operation detecting means includes:

a steering angle sensor which detects a steering angle and an angular velocity generated by the steering operation applied to said steering wheel; and a steering torque sensor which detects a steering torque generated by the steering operation applied to said steering wheel.

4. A steering control apparatus for a vehicle which performs a steering control operation, comprising:

guide line recognizing means for recognizing a guide line provided on a vehicle moving lane on which said vehicle is moving so as to set a target position on the vehicle moving lane based on a result of recognition of said guide line;

steering control means for performing a steering control operation so that said vehicle moves to trace said target position;

steering operation detecting means including:

a steering angle sensor which detects a steering angle and an angular velocity generated by a steering operation applied to said steering wheel, and a steering torque sensor which detects a steering torque generated by the steering operation applied to said steering wheel; and correcting means for correcting an amount of the steering control operation, said correcting means determining a factor for each of the steering angle, the angular velocity and the steering torque generated by the steering operation applied to said steering wheel, the amount of the steering control operation being corrected in accordance with a value obtained from the factors.

5. The steering control apparatus as claimed in claim 4, wherein the factor obtained from the steering angle is set to one when the steering angle is zero and is decreased to zero as the steering angle is increased; the factor obtained from the angular velocity is set to one when the angular velocity is zero and decreased to zero when the angular velocity is increased to a predetermined value; the factor obtained from the steering torque is set to one when the steering torque is zero and starts to decrease to zero when the steering torque exceeds a predetermined value.

6. A steering control apparatus for a vehicle which performs a steering control operation; comprising guide line recognizing means for recognizing a guide line provided on a vehicle moving lane in which such vehicle is moving so as to set a target position in the vehicle moving lane based on a result of recognition of said guide line; steering control means for performing a steering control operation so that said vehicle moves to trace said target position;

steering operation detecting means for detecting an amount of a component of a steering operation applied to a steering wheel by a driver; and correcting means for decreasing an amount of the steering control operation in accordance with the amount of the component of the steering operation detected by said steering operation detecting means.

7. A steering control apparatus for a driver-operable vehicle which performs a steering control operation, comprising:

guide line recognizing means for recognizing a guide line provided on a vehicle moving lane on which said vehicle is moving so as to set a target position on the vehicle moving lane based on a result of recognition of said guide line;

steering control means for performing a steering control operation so that said vehicle moves to trace said target position;

steering operation detecting means including:

a steering angle sensor which detects a steering angle and an angular velocity generated by a steering operation applied to said steering wheel, and a steering torque sensor which detects a steering torque generated by the steering operation applied to said steering wheel, and correcting means for calculating an amount of the steering control operation based on recognition of said guide line, said correcting means determining a factor for each of the steering angle, the angular velocity and the steering torque generated by the steering operation applied to said steering wheel, the amount of the steering control operation being decreased in accordance with a value obtained from the factors.

8. A steering control apparatus for a vehicle which performs a steering control operation; comprising guide line recognizing means for recognizing a guide line provided on a vehicle moving lane in which such vehicle is moving so as to set a target position in the vehicle moving lane based on a result of recognition of said guide line;

steering control means for performing a steering control operation so that said vehicle moves to trace said target position;

steering operation detecting means for detecting an amount of a component of a steering operation applied to a steering wheel by a driver;

calculating means for calculating an amount of the steering control operation to be achieved by said steering control means based on the result of recognition of said guide line; and correcting means for decreasing the calculated amount of the steering control operation in accordance with the amount of the component of the steering operation detected by said steering operation detecting means.

9. The steering control apparatus as claimed in claim 8, wherein said correcting means increases an amount of decrease of the calculated amount of the steering control operation as the amount of the steering operation by the driver increases.

* * * * *